C. ZONCADA.
Improvement in Refrigerators.
No. 130,267. Patented Aug. 6, 1872.
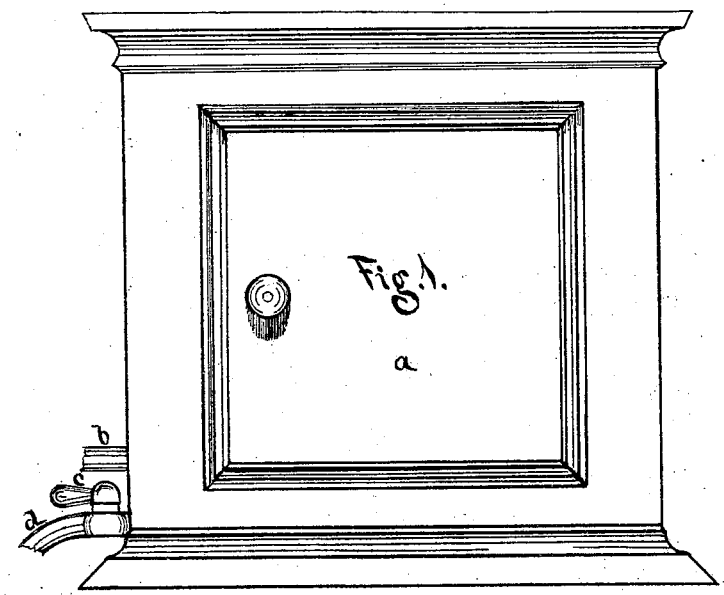
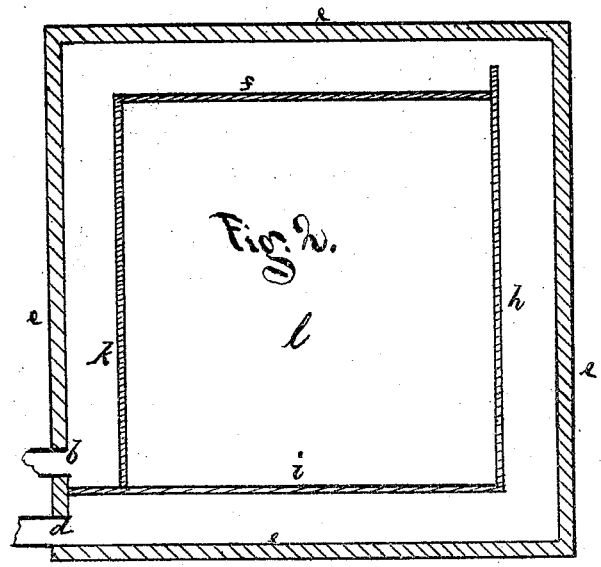
Attest
John Mueller
R. W. Feldkamp.
Chs. Zoncada,
Inventor

UNITED STATES PATENT OFFICE.

CHARLES ZONCADA, OF INDIANAPOLIS, INDIANA.

IMPROVEMENT IN REFRIGERATORS.

Specification forming part of Letters Patent No. 130,267, dated August 6, 1872.

Specification of a Device for Cooling Food and Liquids, invented by CHARLES ZONCADA, of the city of Indianapolis, county of Marion and State of Indiana.

The nature and object of the invention will be understood from the following general description.

Figure No. 1 of the accompanying drawing is a front view of the device; Fig. 2, a section of the same.

The device may be made of any convenient size.

$e$ is a square wooden box. Inside of this is a metal box, represented by $h\ i\ k\ f$. This interior metal box is considerably smaller than the exterior wooden box, so that a convenient space will be left between the two boxes. The interior chamber $l$ of the box $h\ i\ k\ f$ forms a receptacle for the food and liquids to be cooled, and is to be closed by a convenient door, as represented in Fig. 1 by $a$. A tube, $b$, of proper size, enters the chamber between $e$ and $k$, above the partition formed by the projection of $i$. Below this again is another tube, $d$, which connects with the bottom of the chamber between $i$ and $e$. This tube $d$ is provided with a stop-cock, represented by $c$. All the various parts of the device are to be as represented in the drawing.

To use this device, a supply of cold water, which may come from a hydrant or any other convenient source, is let in at the tube $b$. This water, rising up between $e$ and $k$, will come onto $f$, and, still rising, pass over the upward projection of $h$, and flow down between $h$ and $e$ into the space between $i$ and $e$. Now, if the stop-cock $c$ be closed, the water will gradually fill the spaces between $i$ and $e$ and $h$ and $e$. If atmosphere is confined in the top of the space between $f$ and $e$, a stop-cock or door, or any other convenient device, may be provided for its escape. When the space between the wooden box $e$ and the metal box $h\ i\ k\ f$ is all filled with water, if the stop-cock $c$ be sufficiently opened the cool water will flow continuously through the tube $b$, around $k\ f\ h\ i$, and out at $d$, until the supply is exhausted, keeping all the food, liquids, and the like deposited in the chamber $l$ at the same temperature of the water, which it will be found is too low for the formation of insect and vegetable germs. In this way food and the like may be preserved almost if not quite as effectually as by the use of ice. But there are many fluids which will be found to be better when they are cooled in this way.

I claim—

The combination and arrangement of the wooden box $e$, the metal box $h\ i\ k\ f$, the tubes $b$ and $d$, for the passage of a continuous current of cool water flowing between the outer box $e$ and inner box $h\ i\ k\ f$, for the purpose and in the way substantially as set forth.

In testimony that I claim the foregoing specification I have hereunto set my hand this 22d day of June, 1872.

CHS. ZONCADA.

Attest:
  JOHN MUELLER,
  R. W. FELDKAMP.